Nov. 7, 1961 C. R. HILPERT 3,007,351
SPEED RATIO GOVERNOR
Filed April 18, 1960 4 Sheets-Sheet 1

Inventor.
Conrad R. Hilpert.

By John Darley
Attorney.

Nov. 7, 1961

C. R. HILPERT 3,007,351

SPEED RATIO GOVERNOR

Filed April 18, 1960

Inventor.
Conrad R. Hilpert

By John Darley
Attorney.

United States Patent Office 3,007,351
Patented Nov. 7, 1961

3,007,351
SPEED RATIO GOVERNOR
Conrad R. Hilpert, Winnebago, Ill., assignor to Twin Disc Clutch Company, Racine, Wis., a corporation of Wisconsin
Filed Apr. 18, 1960, Ser. No. 22,836
14 Claims. (Cl. 74—732)

My invention relates in particular to a governor for use with a power train including a power source, an hydraulic torque converter, and a power shift gear transmission which connects with a load, and broadly to a mechanism for indicating a change in a predetermined speed ratio of a pair of associated shafts forming part of a power train.

Hydraulic torque converters for industrial service such as tractors, power shovels, off-highway and heavy duty trucks, locomotives, etc., as distinguished from those for the automotive field including passenger cars and trucks up to a determined size, are customarily designed to develop maximum efficiency over a relatively wide range of speed ratios. The latter quantity is defined as the speed of the converter turbine divided by that of the converter impeller. The efficiency curve of an hydraulic torque converter has a rising and falling characteristic between stall and racing corresponding to 0.0 and 1.0 in terms of speed ratio and the converter design is such that its most efficient operation is in a selected range between the above end points.

In some operating situations, it is desirable to couple the converter with a power shift gear transmission as a means of improving the flexibility and economy of the power train. Variations in load and grade with a retention of capacity for acceleration and converter operation in its efficient speed ratio range render necessary a control on the gear transmission shifts such that in any conditioning of the gear transmission the converter will operate in the indicated range.

It is therefore one object of my invention to devise a mechanism that is responsive to one or more determined speed ratios of an hydraulic torque converter and arranged to effect a corresponding number of shifts in the gear transmission, or generally to provide one or more signals or impulses indicating changes in the speed ratios of associated shafts forming part of a power train.

A further object is to provide a mechanism of the character indicated whose operation is rapid and positive at the selected shift point to insure prompt engagement of that clutch which determines operation of the selected gear train in the gear transmission and which may be embodied in exceptionally compact form.

A further object is to provide a governor embodying the above characteristics which is free from hunting even in the region of slight deviations from the selected shift speed ratio.

Figure 1:
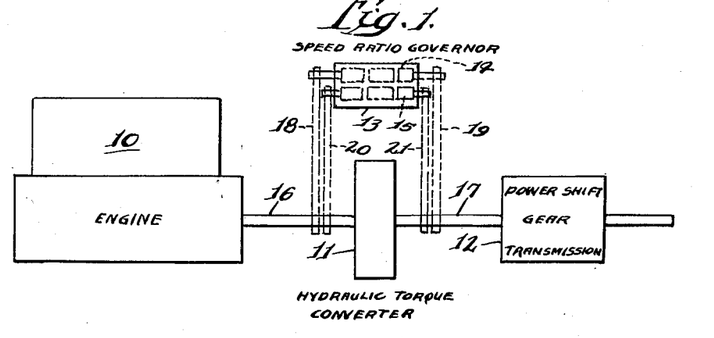
FIG. 1 is a schematic elevation showing the relation of the speed ratio governor to a power train including a power source, an hydraulic torque converter, and a power shift gear transmission.

Referring to FIG. 1, there is illustrated a power train including a power source, such as an engine 10, an hydraulic torque converter 11 of appropriate design for the purpose intended and a power shift gear transmission 12 having a plurality of gear trains which are respectively conditioned for power flow therethrough depending upon the occurrence of selected speed ratios in the converter. To conveniently explain the operative principle, there will be described the use of a composite governor 13 for effecting two shifts in the transmission 12 at relatively high and low speed ratios of the converter 11. Since the transmission 12 is merely the recipient of a signal or signals in the sense that such determines a shift, the signal being initiated by the governor, and per se does not form any part of the present invention, it is only illustrated schematically. For the purpose of disclosure, it will be assumed that the transmission is of the well known constant mesh type in which gear selections are determined in each instance by the engagement of a clutch which will be regarded as oil operated.

The composite governor 13 includes high and low speed ratio governors 14 and 15, respectively, which are shown only schematically in FIG. 1 and will be described in detail hereinafter. The governors 14 and 15 are responsive to speed ratio changes in the converter 11, the opposite, input ends of the high speed ratio governor 14 being driven from the converter input and output shafts 16 and 17 by speed ratio connectors 18 and 19, all respectively, while the opposite, input ends of the low speed ratio governor 15 are driven from the converter input and output shafts 16 and 17 by speed ratio connectors 20 and 21, all respectively. The speed ratio connectors 18, 19, 20 and 21 may take the form of gear trains, chains, flexible shafts or belts and are conditioned so that the speed inputs to the opposite ends of the high and low speed ratio governors 14 and 15, respectively, bear selected proportional relations to the speeds of the converter input and output shafts 16 and 17, respectively.

For the purpose of matching certain electric circuit conditions presently described and not by way of restriction, it will be assumed that the opposite ends of the governors 14 and 15 are driven clockwise as viewed from the right in FIG. 1. To avoid terminology confusion in the use of the term "speed ratio," as applied to the connectors 18, 19, 20 and 21 and the converter 11, the former will hereinafter be referred to as belts.

Figure 2:
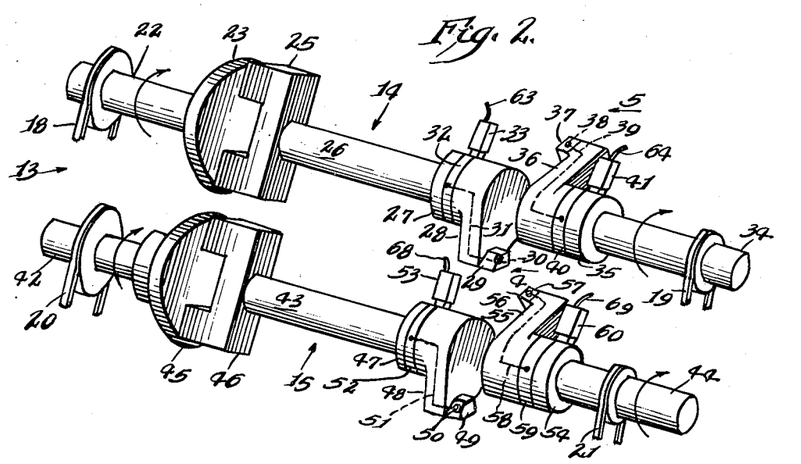
FIG. 2 is an isometric view, partially schematic, of one form of a composite governor, the enclosing casing being omitted, showing two governors in non-shift positions, each controlling a shift in the gear transmission.

Referring to FIG. 2, there is shown in detail the composite governor 13 including the high speed ratio governor 14 and low speed ratio governor 15 which are enclosed in a casing, not shown, and in which are suitably journaled the several shafts of the governors as presently described.

Figure 3:
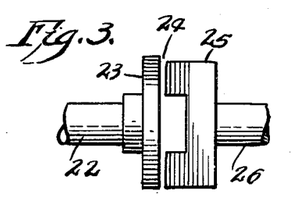
FIG. 3 is a fragmentary side elevation showing the gap relation between a permanent magnet and associated armature disk and which relation may exist in each governor.

The high speed ratio governor 14 includes an input shaft 22 which is driven by the belt 18 and has fixed thereto an armature disk 23 composed of a material having suitable magnetic properties including high retentiveness and related magnetically through the usual air gaps 24 (see FIG. 3) to the arms of a permanent magnet 25 to provide a hysteresis clutch, the magnet 25 being carried by one end of an intermediate shaft 26 that is axially aligned with the shaft 22. While this air gap relation is shown as a matter of convenience in all of armature-permanent magnet structures disclosed herein, it will be understood that the essential principle involved is that of magnetically locking the shafts 22 and 26 when rotating at the same speed while permitting their relative slip when rotating at different speeds.

The opposite end of the shaft 26 has fixed thereto a rotor 27 composed of insulating material, such as Bakelite, and which includes a radial arm 28 carrying a laterally projecting lug 29 that is generally parallel to the axis of the shaft 26. Extending from the trailing face of the lug 29, considered with respect to the clockwise rotation of the rotor 27, is a contact 30 which electrically connects by a wire 31, schematically shown and embedded in the rotor 27, with a slip ring 32 that is recessed in the circumferential surface of the rotor 27 and is continuously wiped by a brush 33.

Figure 4:
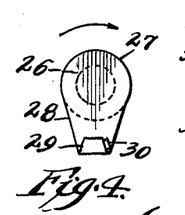
FIGS. 4 and 5 are fragmentary elevations looking in the directions of the arrows 4 and 5, respectively, in FIG. 2 showing certain contacts.
Figure 5:
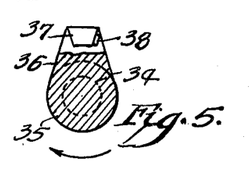

The high speed ratio governor 14 further includes another input shaft 34 which is coaxial with the shafts 22 and 26 and is driven at its outer or right end, as viewed in FIG. 2, by the belt 19. The shaft 34 has fixed on its left or inner end a rotor 35 similar to and cooperably related as presently described to the rotor 27. Accordingly, the rotor 35 includes a radial arm 36, a lug 37 positioned to extend into the rotary path of the lug 29 and a contact 38 on the leading face of the lug 37 and which electrically connects by a wire 39 embedded in the rotor 35 with a slip ring 40 recessed in the circumferential surface of the rotor 35 and wiped by a brush 41. The contacts 30 and 38 are at the same radial distance from the axis of the governor 14 and their positions on the rotors 27 and 35 are more clearly shown in FIGS. 4 and 5, all respectively.

By way of example, it will be assumed that the shaft 22 is driven by the belt 18 in the same direction and at the same speed as the converter input shaft 16 while the shaft 34 is driven by the belt 19 in the same direction and at a slightly higher speed than the speed of the converter output shaft 17. These relative speed conditions will depend upon the operating requirements.

It will be apparent that if the shafts 22 and 34 are rotating clockwise as viewed from the right end of FIG. 2, the magnetic hysteresis clutch relation between the armature disk 23 and magnet 25 insures a synchronous rotation of the shafts 22 and 26 as long as a rotative impulse is not applied to the shaft 26. If the speed of the shaft 34 exceeds that of the shaft 22, the rotor 35 rotates faster than the rotor 27 so that the contacts 30 and 38 engage and establish an electrical connection between the brushes 33 and 41, the magnet 25 then rotating relative to the armature disk 23, as permitted by the magnetic slip between these parts. In this connection, it will be understood that the contact 30 and the contact 38 project from only one face, respectively, of the lugs 29 and 37 and lie in the same circumferential orbit. Contacts do not extend from the opposite faces of the lugs 29 and 37 so that if the speed of the shaft 34 is slower than that of the shaft 22, the contacts 30 and 38 disengage and the engagement of the lugs 29 and 37 on their non-contact faces will not have any effect.

The low speed ratio governor 15 is identical with the high speed ratio governor 14 with the exceptions of the speed inputs to opposite ends of the governor 15, this under the assumed conditions, and of the positions of the contacts on the rotors thereof.

Accordingly, the low speed ratio governor 15 includes axially aligned shafts 42, 43 and 44, each suitably journaled in the aforesaid casing and corresponding, respectively, to the shafts 22, 26 and 34, the alignments of these shaft groups being parallel. The shaft 42 is driven by the belt 20 in the same direction as the converter input shaft 16 and the shaft 22 and, under the assumed condition, at a speed somewhat slower than that of the shaft 22. The shaft 42 carries an armature disk 45 having the stated air gap relation to the arms of a permanent magnet 46 that is fast on the adjacent end of the shaft 43 whose opposite end carries a rotor 47. A radial arm 48 extends from one end of the rotor 47 and laterally projecting from this arm is a lug 49 that is generally parallel to the axis of the shaft 42 and carries on the rotationally leading face thereof a contact 50. The contact 50 electrically connects by a schematically shown wire 51 with a slip ring 52 respectively embedded and recessed in the rotor 47, the slip ring 52 being constantly wiped by a brush 53.

Operatively related to the rotor 47 and carried by the adjacent end of the shaft 44 is a rotor 54 having a radial arm 55 provided with a lug 56 projecting laterally therefrom and opposite to the lug 49. A rotationally trailing face of the lug 56 carries a contact 57 at the same radius as the contact 50 which electrically connects by a schematically shown wire 58 with a slip ring 59 recessed in the rotor 55 and which is constantly wiped by a brush 60. As indicated for the high speed ratio governor 14, the lugs 49 and 56 are positioned for interception depending upon the speed relations of the rotors 47 and 54, one interception establishing an engagement of the contacts 50 and 57 and a circuit connection between the brushes 53 and 60, but the other interception determines nothing since the respective surfaces of the lugs 49 and 56 which are opposite to the contacts 50 and 57 are devoid of contacts.

The opposite end of the shaft 44 is driven by the belt 21 in the same direction as the converter output shaft 17 and the shaft 34 and, under the assumed condition, at a speed somewhat faster than that of the shaft 34.

The composite governor 13 shown in FIG. 2 is intended to control shifts in the transmission 12 which is assumed to have two power shift gear ratios whose selection is determined by the governor at some shift points corresponding to selected, relatively high and low speed ratios of the converter 11. Governor operation at these ratios is determined by appropriately relating the speeds of the belts 18, 19, 20 and 21. The governor 13 is tied in with the fluid actuated clutches of the gear transmission by means of an electric circuit which will now be described.

Figures 6, 7:
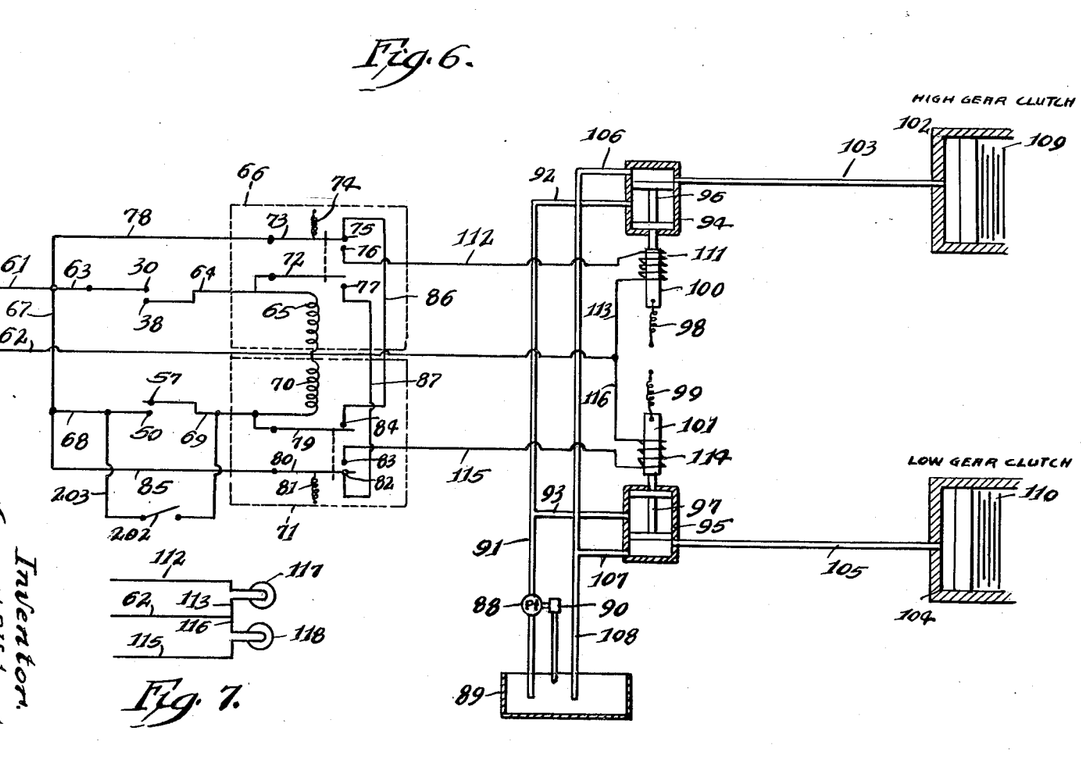
FIG. 6 is a schematic of the electric circuit whose energization by one or the other of the governors at relatively high and low speed ratios of the converter determines the engagement of an associated fluid actuated clutch and drive through a connected gear train.
FIG. 7 shows a modified circuit for the FIG. 6 governor.

Referring to FIG. 6, the electric circuit is preferably connected to a direct current source (not shown) by wires 61 and 62. The wire 61 connects by a wire 63 with the high speed ratio governor contact 30 which is shown in disconnected relation to the associated contact 38 that connects by a wire 64 with one end of a coil 65 whose opposite end connects with the power wire 62 and which coil forms part of a relay 66. The wires 63 and 64 schematically includes collectively (see FIG. 2) the brush 33, slip ring 32 and wire 31, and the wire 39, slip ring 40, and brush 41, respectively, while the contacts 30 and 38 are shown in conventional switch-contact relation.

The power wire 61, which may be regarded as the hot wire, also connects through wires 67 and 68 with the low speed ratio governor contact 50 which is shown in disconnected relation to the associated contact 57 that connects by a wire 69 with one end of a coil 70 whose opposite end connects with the power wire 62 and which coil forms part of a relay 71. The wires 68 and 69 schematically include collectively (see FIG. 2) the brush 53, slip ring 52 and wire 51, and the wire 58, slip ring 59 and brush 60, respectively, while the contacts 50 and 57 are for convenience shown in switch-contact relation.

Energization of the coil 65 determines simultaneous movements of switches 72 and 73 which are mechanically tied together and biased by a spring 74 to close the switch 73 on a contact 75 while opening the latter switch from a contact 76 and the switch 72 from a contact 77 when the coil 65 is deenergized, the switch 72 being electrically connected to the wire 64 and the switch 73 being connected through a wire 78 with the power wire 61.

Similarly, for the low speed ratio contacts 50 and 57, energization of the coil 70 determines simultaneous movements of switches 79 and 80 which are mechanically tied together and biased by a spring 81 to close the switch 80 on a contact 82 while opening the latter switch from a contact 83 and the switch 79 from a contact 84 when the coil 70 is deenergized, the switch 79 being electrically connected to the wire 69 and the switch 80 connecting through a wire 85 with the wire 68 and hence with the power wire 61. The contacts 75 and 84 of the respective relays 66 and 71 are cross connected by a wire 86, while the contacts 77 and 82 of the same respective relays are cross connected by a wire 87, all for purposes presently explained.

The above circuit determines the flow of actuating fluid, such as oil, to one or the other of the cylinders of a fluid operated clutch associated with one gear train of the gear transmission 12 as will now be described.

Still referring to FIG. 6 and considering oil as the actuating fluid, a pump 88 withdraws oil from a convenient sump 89 under conventional pressure regulating control generally represented by the numeral 90 and delivers the same to a supply manifold 91 having branches 92 and 93 connecting with casings 94 and 95 in which are reciprocable typical spool valves 96 and 97, all respectively. The valves 96 and 97 are biased to the positions shown in which oil pressure is denied to the clutch cylinders presently described by springs 98 and 99 which connect with the opposed ends of solenoid cores 100 and 101 whose opposite ends connect with the spool valves 96 and 97, all respectively. In such positions of the valves, the branches 92 and 93 supply pressure to the casings 94 and 95 between the equisized ends of the valves 96 and 97 so that there cannot be any movements of the valves due to such pressure.

The high gear clutch cylinder 102 connects through a pipe 103 with the valve casing 94 above the shown position of the valve 96 while the low gear clutch cylinder 104 connects through a pipe 105 with the valve casing 95 below the shown position of the valve 97. In these positions of the valves 96 and 97, the pipes 103 and 105 communicate through the valve casings 94 and 95 with branches 106 and 107, all respectively, forming part of an exhaust manifold 108 leading to the sump 89 and the high and low gear clutches 109 and 110 stand released.

To shift one or the other of the valves 96 and 97 to positions admitting pressure to the associated clutch cylinders 102 or 104, as the case may be, the following instrumentalities are provided. A coil 111 is associated with the core 100 and its opposite ends, respectively connect by a wire 112 with the contact 76 and by a wire 113 with the power wire 62, while a coal 114 associated with the core 101 has its opposite ends respectively connected by a wire 115 with the contact 83 and by a wire 116 with the power wire 62.

Before discussing the operation in detail, the advantages of the governor can be readily understood by considering a typical efficiency curve for the hydraulic torque converter. As its speed ratio approaches stall torque, the curve has a sharply falling characteristic and the same is true at the opposite end of the curve as the speed ratio approaches racing value. In between these falling curve portions, the curve is generally flat and the converter is most efficient when operating in some part of the flat portion of the curve. This is arranged by making the governor responsive to changing speed ratios in the converter which reflect changes in the load, whether relatively light or relatively heavy. In the present instance, since the transmission 12 has, for example, only two gear trains, high and low, the governor 13 is arranged for two shift points and for purpose of description and not by way of restriction, these points are assumed to be at low and high speed converter ratios of 0.3 and 0.75, respectively. Governor operation at these ratios is determined by appropriately relating the input speeds of the belts 18, 19, 20 and 21 to the respective associated ends of the high and low speed ratio governors 14 and 15.

FIGS. 2 and 6 show the several parts in a condition of rest, no power flow through the power train, and it will be assumed that the governor contacts 30 and 38, and 50 and 57, are separated, the valves 96 and 97 are in the positions shown in FIG. 6, and the clutches 109 and 110 are released.

To start operation in low gear, it is preferable to include a switch 202 forming part of wiring, generally indicated by the numeral 203, which is in parallel with the part of the circuit including the contacts 50 and 57. Hence, closing of the switch 202 performs the same function as engagement of the contacts 50 and 57. It is only necessary to momentarily close the switch 202 to thereby energize the relay coil 70 and shift the switches 79 and 80 to respectively close on the contacts 84 and 83.

The relay 71 is now conditioned to determine engagement of the low gear clutch 110. The opening of the switch 202 does not disturb energization of the relay coil 70 which is continued by a holding circuit including wires 61 and 78, switch 73, contact 75, wire 86, contact 84, switch 79, wire 69, relay coil 70 and power wire 62.

With the closing of the switch 80 on the contact 83, the solenoid coil 114 is energized through the wires 61, 67 and 85, switch 80, contact 83, and wires 115, 116 and 62 so that the valve 97 shifts downwardly to admit pressure to the cylinder 104 of the low gear clutch 110 and effect operation of the associated low gear train (not shown).

With a drop in the load, the speed of the converter output shaft 17 begins to increase and when the speed ratio of the converter 11 exceeds the selected high speed ratio shift point, 0.75 in the assumed example, the high speed ratio contacts 30 and 38 of the high speed ratio governor 14 close, the contact 38 overtaking the contact 30, thus energizing the relay coil 65 and moving the switches 72 and 73 to respectively close on the contacts 77 and 76.

The relay 66 is now conditioned to secure engagement of the high gear clutch 109, but it is important to note that the movement of the switch 73 away from the contact 75 breaks the holding circuit including the switch 79 and contact 84 hitherto energizing the relay coil 70 so that the switches 79 and 80 are restored to the positions shown in FIG. 6. Hence, this operation effects several results, viz, it interrupts the circuit including the solenoid coil 114 to thereby release the low gear clutch 110 and prevents simultaneous engagements of the clutches 109 and 110, and also establishes a holding circuit for the relay coil 65, including the switch 72 and contact 77 as presently described.

The solenoid coil 111 is now energized through the wires 61 and 78, switch 73, contact 76, and wires 112 and 113 to the power wire 62 so that the valve 96 shifts upwardly to admit pressure to the cylinder 102 of the high gear clutch 109 and place in operation the associated high gear train (not shown). During this operation, it is important to note that the switch 80 is closed on the contact 82 which connects by wire 87 with the contact 77, the coil 70 not being energized.

With the transmission 12 in high gear, the speed ratio of the converter 11 drops below the high speed ratio shift point or into the desired operating range of the converter, and since converter operation is still above the low speed ratio shift point, the low speed ratio governor 15 is inoperative since when the speed of the rotor 54 increases relative to that of the rotor 47, the lugs 49 and 56 engage on those faces which are not provided with contacts.

However, in the high speed ratio governor 14, the change in converter speed ratio derived from the engagement of the high gear clutch 109 effects a separation of the contacts 30 and 38, but the relay coil 65 remains energized to continue the engagement of the high gear clutch 109. This energization is due to the holding circuit including wires 61, 67 and 85, switch 80, contact 82, wire 87, contact 77, switch 72, wire 84, relay coil 65 and power wire 62. This condition continues as long as the speed ratio of the converter 11 remains above the low speed ratio shift point.

If the load increases, the speed of the converter output shaft 17 decreases and when the converter speed ratio drops below the selected low speed ratio shift point, 0.3 in the assumed example, the low speed ratio governor contacts 50 and 57 close since the contact 50 overtakes the contact 57, thus energizing the relay coil 70 and shifting the switches 79 and 80 to respectively close on the contacts 84 and 83. The relay 71 is now conditioned to determine engagement of the low gear clutch 110 as already described for the start condition, but, importantly, the movement of the switch 80 away from the contact 82 breaks the holding circuit hitherto energizing the coil 65 so that the switches 72 and 73 are restored to the positions shown in FIG. 6. This operation accomplishes several results, viz., it interrupts the circuit including the solenoid coil 111 to thereby effect a release of the high gear clutch 109 and prevent simultaneous engagements of the clutches 109 and 110, and also by reason of the closing of the switch 73 on the contact 75, a holding circuit for the relay coil 70 is established as described above.

With the gear transmission 12 in low gear, the speed ratio of the converter 11 rises above the low speed ratio shift point or into the desired operating range of the converter 11 and since converter operation is still below the high speed ratio shift point, the high speed ratio governor 14 is inoperative since any engagement of the lugs 29 and 37 will be on faces thereof not provided with contacts. In the low speed ratio governor 15, however, the change in converter speed ratio derived from engagement of the low gear clutch 110 causes a separation of the contacts 50 and 57, but engagement of the low gear clutch 110 is maintained since energization of the relay coil 70 is continued by the holding circuit described above. The low gear clutch 110 thereafter remains engaged until a change in operating conditions raises the speed ratio of the converter 11 above the high speed ratio shift point when the low gear clutch 110 is released and the high gear clutch 109 is engaged as described above.

To illustrate the operating characteristics of the device, it has been described only in connection with a gear transmission having two gear shifts controlled respectively at the low and high speed ratio ends of the best part of the efficiency curve of the converter and with each shift being determined by a governor. A gear transmission having additional shifts may also be employed and it is only necessary to use a governor, similar to the governors 14 and 15, for each shift. In such an arrangement, the input ends of the several governors would have their speeds adjusted in accordance with the principles outlined for the composite governor 13 to achieve gear shifts at the selected speed ratios of the converter.

The governor is inherently free of any hunting action since when contact is made in the governor in response to a selected converter speed ratio, the indicated result certainly and precisely follows. Also since such result is occasioned by engagement of contacts, the governor is characterized by snap action.

Further, the solenoid controls on the admission and discharge of oil to and from the high and low gear clutches 109 and 110, respectively, are intended to be functionally schematic of any automatic control for accomplishing these purposes. This consideration stems from the fact that, when responding at its shift point, each governor in effect emits a signal or impulse which may be used as desired.

For example, gear shifts in the transmission could be manually controlled in the well known manner by the operator who would be visually guided in his actions by light bulbs on a lightboard. Such an arrangement is schematically shown in FIG. 7 to which reference will now be made. Parts in FIG. 7 which are identical with those in FIG. 6 are designated by the same numerals.

It will be apparent that the light bulbs 117 and 118 occupy the same positions in the circuit as do the solenoid coils 111 and 114, respectively. In other words, when the relay coil 65 is energized, the bulb 117 will be illuminated, while the circuit through the bulb 118 will be complete when the relay coil 70 is energized. When the bulb 117 is illuminated, the operator is thus notified to engage the high gear clutch 109 and even after the contacts 30 and 38 separate, illumination of the bulb 117 is continued by the holding circuit above described so that the operator continues to have knowledge of which gear train is engaged. When the load increases sufficiently to necessitate a shift to low gear, illumination of the bulb ceases and the bulb 118 is illuminated and will so continue until conditions dictate a shift to high gear. This arrangement eliminates the automatically controlled, fluid actuated clutch system shown in FIG. 6.

An obvious variation of the FIG. 7 circuit would be achieved by eliminating the relays 66 and 71 and connecting the wires 112 and 113 to the wires 64 and 69, respectively. Thereafter, between shift points identified by the selected converter speed ratios, the bulbs 117 and 118 would be dark and their illumination would be determined only by closure of the contacts 30 and 38, and the contacts 50 and 57, respectively.

In FIGS. 8 to 11, inclusive, is illustrated a variant composite speed ratio governor 119 including increasing and decreasing speed ratio governors 120 and 121, respectively, for use with a gear transmission having any number of gear changes. The governors 120 and 121 are identical with the governors 14 and 15, respectively, except for the addition of two contacts and two brushes to each governor 120 and 121 for cooperation with electric circuits which are different from those used with the composite governor 13. This arrangement provides for control of any number of gear shifts in a gear transmission by the sole use of the governors 120 and 121 as distinguished from the indicated limitation on the use of the governors 14 and 15.

Figure 8:
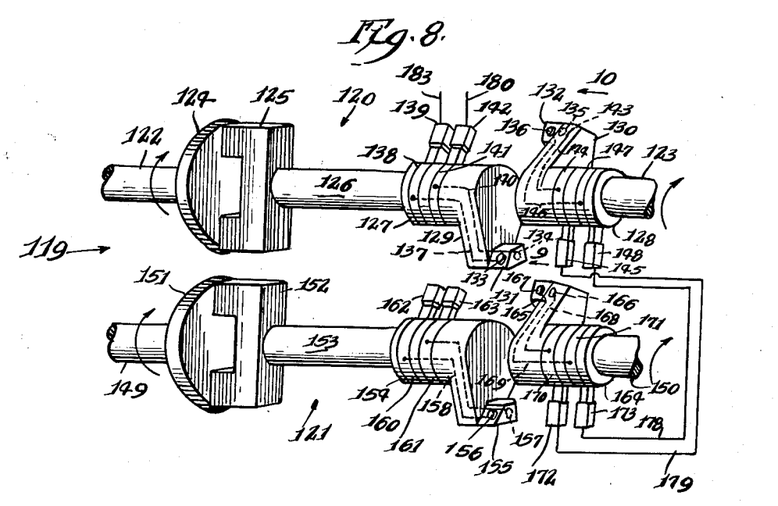
FIG. 8 is a view similar to FIG. 2 showing a modified arrangement of the composite governor.

Referring to FIG. 8, the increasing speed ratio governor 120 includes axially aligned, input shafts 122 and 123 at opposite ends thereof which are respectively driven in clockwise directions as viewed from the right in FIG. 8 by the converter input and output shafts 16 and 17. The shafts 122 and 123 are driven, as by the belts 18 and 19, respectively, at speeds proportional to those of the shafts 16 and 17, respectively, for reasons noted in connection with the high speed ratio governor 14. The shaft 122 carries an armature disk 124 which is magnetically related to the arms of a permanent magnet 125 carried by one end of an axially aligned, intermediate shaft 126, the magnetic relation being the same as that between the disk 23 and magnet 25 in FIG. 2. The opposite end of the latter shaft carries a rotor 127 which is axially spaced from a rotor 128 fixed on the shaft 123. Except for details presently noted, the rotors 127 and 128 are identical with the rotors 27 and 35, respectively, and are therefore provided with radial arms 129 and 130 which carry lugs 131 and 132, all respectively, the lugs being arranged for movement in the same circuit orbit.

Figure 9:
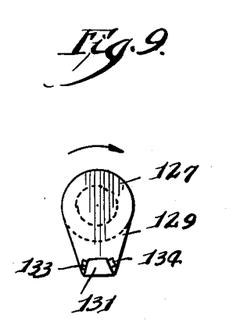
FIGS. 9 and 10 are fragmentary elevations looking in the directions of the arrows 9 and 10, respectively, in FIG. 8 showing certain contact details in the high and low speed ratio governors.
Figure 10:
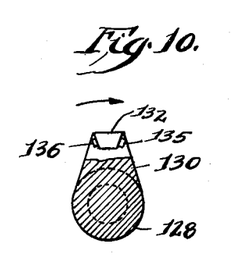

The lug 131 carries on its leading and trailing faces, considered with respect to the clockwise rotation of the rotor 129, contacts 133 and 134, respectively (see FIG. 9), while the lug 132 carries on its leading and trailing faces contacts 135 and 136 (see FIG. 10). The contact 133 electrically connects by a wire 137 with a slip ring 138 that is continuously wiped by a brush 139, while the contact 134 electrically connects by a wire 140 with a slip ring 141 that is continuously wiped by a brush 142. The contact 135 electrically connects by a wire 143 with a slip ring 144 which is continuously wiped by a brush 145, while the contact 136 electrically connects by a wire 146 with a slip ring 147 that is continuously wiped by a brush 148. The slip rings 138 and 141, and 144 and 147, may be recessed in the circumferential surfaces of the rotors 127 and 128, respectively, while the wires 137, 140, 143 and 146 are schematically shown and are embedded in the associated rotors.

The decreasing speed ratio governor 121 is identical with the governor 120 and its input shafts 149 and 150 are driven clockwise at appropriate speeds by the converter input and output shafts 16 and 17, respectively. The relation of the armature disk 151, permanent magnet 152 and intermediate shaft 153 is the same as for the comparable parts in the governor 120.

For the rotor 154 which is carried by the intermediate shaft 153, the lug 155 is provided on its leading and trailing faces with contacts 156 and 157 which electrically connect by wires 158 and 159, schematically shown, with slip rings 160 and 161 which are continuously wiped by brushes 162 and 163, all respectively. For the rotor 164 which is carried by the shaft 150, the lug 165 is provided on its leading and trailing faces with contacts 166 and 167 which electrically connect by wires 168 and 169, schematically shown, with slip rings 170 and 171 which are continuously wiped by brushes 172 and 173, all respectively. When viewed in the direction of the arrow 9 in FIG. 8, the contacts 156 and 157 are related to the lug 155 in the same manner as the contacts 133 and 134 are to the lug 131, respectively, as shown in FIG. 9, while the contacts 166 and 167, when viewed in the direction of the arrow 10 in FIG. 8, are related to the lug 165 in the same manner as the contacts 135 and 136 are to the lug 132, respectively, as shown in FIG. 10.

The composite governor 119 is associated with an electric circuit for immediately determining the engagement and release of the fluid actuated clutches of the transmission and this circuit along with the fluid circuit for the clutches are more particularly shown in FIG. 11 to which reference will now be made.

It will be assumed that the electric circuit is powered by a direct current source (not shown) through power wires 174 and 175. The power wire 174 connects through branch wires 176 and 177 with the contacts 156 and 157 which are shown in conventional switch-contact relation to the contacts 167 and 166, all respectively, these contacts forming a part of the decreasing speed ratio governor 121. The wire 176 includes collectively the brush 162, slip ring 160, and wire 158, while the wire 177 includes collectively the brush 163, slip ring 161, and wire 159, all as shown in FIG. 8.

The contacts 167 and 166 connect by wires 178 and 179 with the contacts 136 and 135 which are shown in conventional switch-contact relation to the contacts 133 and 134, all respectively. The wire 178 includes collectively, in the decreasing speed ratio governor 121, the wire 169, slip ring 171 and brush 173 and, in the increasing speed ratio governor 120, the brush 148, slip ring 147 and wire 146, while the wire 179 includes collectively, in the decreasing speed ratio governor 121, the wire 168, slip ring 170 and brush 172 and, in the increasing speed ratio governor 120, the brush 145, slip ring 144 and wire 143.

The contact 134 connects by a wire 180 with one end of an increasing speed ratio coil 181 forming part of a so-called add and subtract relay 182, schematically shown, and the opposite end of the coil 181 connects with the power wire 175. Similarly, the contact 133 connects by a wire 183 with one end of a decreasing speed ratio coil 184, also forming a part of the relay 182, and the other end of the coil 184 connects with the power wire 175. The wire 180 includes collectively (see FIG. 8) the wire 140, slip ring 141 and brush 142, while the wire 183 includes collectively the wire 137, slip ring 138 and brush 139.

For purpose of disclosure, the relay 182 may be the commercially available Guardian Series RAS add and subtract relay which is arranged so that when the coils 181 and 184 are separately energized, the indexing mechanism thereof is moved in opposite directions, respectively, to thereby determine an up or down shift in a gear transmission 12' which would be substituted for the transmission 12 in the FIG. 1 power train and which, by way of example, is assumed to have four speed changes as representative of any number of such changes. These speed shifts are effected at selected speed ratios of the converter to insure its operation on the flat portion of its efficiency curve.

Associated with the relay coil 181 is an armature 185 suitably biased to the "off" position shown and which, when the coil 181 is energized, causes a member 186 to rotate a ratchet wheel 187 a determined distance in a clockwise direction for the particular arrangement shown, the ratchet wheel 187 forming a part of the relay indexing mechanism. Similarly, an armature 188, biased to the "off" position shown, is associated with the relay coil 184 and upon energization thereof, this armature causes a member 189 to rotate the ratchet wheel 187 a determined distance in a counterclockwise direction.

Figure 11:
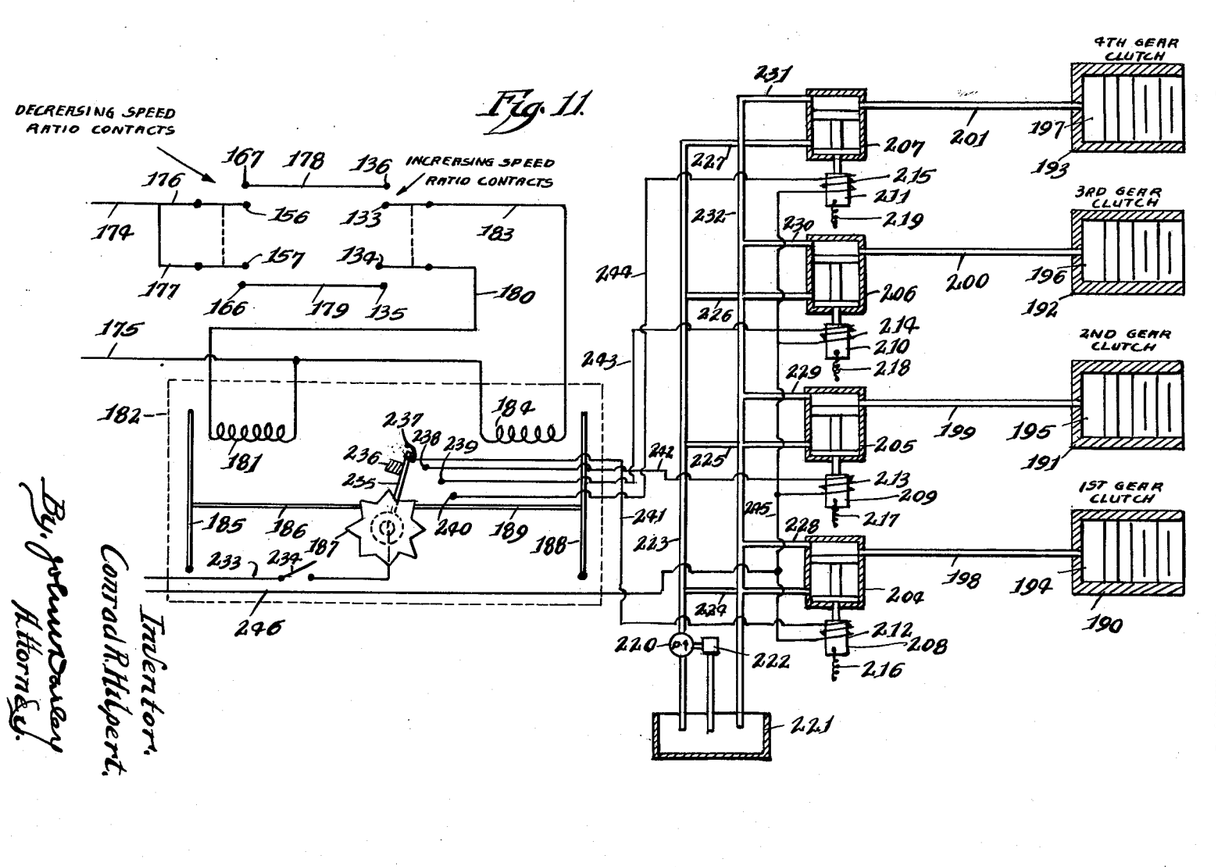
FIG. 11 is a schematic of the electric circuit which is associated with the governor shown in FIG. 8.

The fluid circuits for the four clutches determining corresponding gear changes in a four-shift gear transmission 12' are schematically shown in FIG. 11 and oil will be regarded as the actuating medium. First, second, third and fourth oil actuated gear clutches, designated by the numerals 190, 191, 192 and 193, include cylinders 194, 195, 196 and 197 which connect by pipes 198, 199, 200 and 201 with control valves, generally indicated by the numerals 204, 205, 206 and 207, whose movements in directions admitting oil pressure to the associated clutch cylinders are determined by solenoid cores 208, 209, 210 and 211 which are associated with coils 212, 213, 214 and 215, all respectively. The control valves 204, 205, 206 and 207 are biased to positions denying oil pressure to the associated clutch cylinders and connecting such cylinders to the sump as presently described by springs 216, 217, 218 and 219 which are connected to the cores 208, 209, 210 and 211, all respectively, and it is these positions which are shown in FIG. 10. The valving elements in each of the control valves 204, 205, 206 and 207 is identical with the spool-shaped valve 96 (see FIG. 6).

Oil for the several clutch cylinders is withdrawn by a pump 220 from a convenient sump 221 under conventional pressure regulating control generally indicated by the numeral 222 and delivers the same to a supply manifold 223 having branches 224, 225, 226 and 227 which connect with the casings of the control valves 204, 205, 206 and 207, respectively, between the equisized ends of the valving elements in such valves in the same manner as the manifold branch 92 connects with the casing 94 (see FIG. 6).

In the non-pressure admitting positions of the control valves 204, 205, 206 and 207, the clutch cylinders 194, 195, 196 and 197 connect through the pipes 198, 199, 200 and 201 and the casings of such valves with branches 228, 229, 230 and 231, all respectively, forming part of an exhaust manifold 232 leading to the sump 221.

Considering the remainder of the electric circuit in FIG. 11 a power wire 233 including a master switch 234 connects with a radial switch 235 which rotarily moves with the ratchet wheel 187 and is shown as abutting an insulated stop 236. The outer end of the radial switch 235, when moved as presently described, is arranged to sweep over spaced contacts 237, 238, 239 and 240 forming part of the relay 182 and positioned along an arc of suitable radius. The contacts 237, 238, 239 and 240 connect by wires 241, 242, 243 and 244 with the solenoid coils 212, 213, 214 and 215, all respectively, and the return connections from these coils is through a common wire 245 to the other power wire 246.

In the stop abutting position of the radial switch 235 shown in FIG. 11, this switch also engages the contact 237 which connects with the solenoid coil 212 that determines engagement of the first gear clutch 191, but this clutch stands released since the master switch 234 is open. At the same time, the clutches 191, 192 and 193 are also released, the coils 213, 214 and 215 for these clutches being connected to the contacts 238, 239 and 240, all respectively.

In considering the operation of the modified governor shown in FIGS. 8 to 11, reference will first be made to FIG. 11 which shows the condition obtaining when the power train is at rest, all clutches released, the radial switch 235 abutting the stop 236 and in engagement with the first gear clutch contact 237, the master switch 234 open, and it being assumed that all contacts in the composite governor 119 are open.

To start under load in first gear, the master switch 234 is closed, thus completing the circuit through the solenoid coil 212 and shifting the control valve 204 to a position admitting pressure oil to the cylinder 194 to engage the first gear clutch 190.

If the load is removed or substantially decreased, the speed of the converter output shaft 17 begins to increase with a consequent rise in the speed ratio of the converter 11 and in the speeds of the rotors 128 and 164 relative to those of the rotors 127 and 154, respectively. Assuming a continued rise in the converter speed ratio above the selected speed ratio shift point corresponding to first gear, the contacts 134 and 135 on the increasing speed ratio governor 120 close as do the contacts 157 and 166 on the decreasing speed ratio governor 121 (see FIGS. 8 and 11), it being remembered that the assumed directions of rotation of the two governors are clockwise as viewed from the right in FIG. 8. The contacts 157 and 166 close for the same reason as do the contacts 134 and 135 since, in each instance, the two governors reflect an existing converter speed ratio above their respective geared speed ratios.

These contact closures complete the circuit through the coil 181 so that the armature 185 is rocked to the right, as viewed in FIG. 11, to effect a clockwise rotation of the ratchet wheel 187 and a shifting of the switch 235 from the contact 237 to the contact 238. This switch movement deenergizes the solenoid coil 212 to thereby release the first gear clutch 190 and energizes the solenoid coil 213 to engage the second gear clutch 191. Accordingly, there is no possibility of the clutches 190 and 191 being simultaneously engaged.

Since the transmission 12' is in second gear and assuming that the converter speed ratio does not further increase, this speed ratio drops below the second speed ratio shift point and the contacts 134 and 135 separate so that the coil 181 is deenergized and the armature 185 returns to the position shown in FIG. 11, but this movement does not disturb the hitherto shifted position of the ratchet wheel 187 and the switch 235 remains closed on the contact 238. However, the contacts 157 and 166 remain closed because the decreasing speed ratio governor 121 still senses a converter speed ratio above its geared speed ratio.

From the above description of a shift from first to second gear, it will be apparent that a continued increase in the converter speed ratio will progressively shift the transmission 12' through third to fourth gear by the converter speed ratio dictated movement of the radial switch 235 into successive engagements with the contacts 239 and 240, respectively. It is obviously not necessary that the final upward shift reached shall be fourth gear; the geared ratio at any time will be that determined by the related converter speed ratio.

Assuming the transmission 12' in fourth gear and the radial switch 235 in engagement with the contact 240, if the load is increased, the speed of the converter output shaft 17 decreases along with those of the rotors 128 and 164 whose speeds become less than those of the rotors 127 and 154, respectively. Hence, the contact 133 begins to overtake the contact 136 in the increasing speed ratio governor 120 and the contact 156 acts similarly with respect to the contact 167 in the decreasing speed ratio governor 121. When the speed ratio of the converter 11 drops below the speed ratio shift point corresponding to third gear, the contacts 133 and 156 close on the contacts 136 and 167, respectively, so that the relay coil 184 is energized, the contacts 157 and 166 being then separated and the contacts 134 and 135 having previously been so conditioned. Accordingly, the armature 188 is rocked to the left, as viewed in FIG. 11, to shift the switch 235 from closure on the contact 240 to thereby release the fourth gear clutch 193 and into closure with the contact 239, thus energizing the solenoid coil 214 and effecting engagement of the third gear clutch 110. With the power train so conditioned, the converter speed ratio rises above the third speed ratio shift point, assuming no further decrease in the converter speed ratio, and the contacts 156 and 167 separate, but the contacts 133 and 136 remain closed. The coil 184 is therefore deenergized and the armature 188 returns to the position shown in FIG. 11, but this movement does not disturb the closure of the switch 235 on the contact 239.

With the transmission 12' in third gear, if the converter speed ratio continues to decrease, successive down shifts will occur through second to first gear, the radial switch 235 being moved by the governor operation into successive engagements with the contacts 238 and 237.

From the foregoing, it will be apparent that the converter 11 is at all times conditioned for operation within its most efficient speed ratio range. Each time that the converter speed ratio exceeds a selected speed ratio or drops below a selected speed ratio, the converter speed ratio is automatically restored to lie within the desired range of speed ratios by engagement of the appropriate clutch. In other words, and considering by way of example, shifts between first and second gear, when the speed ratio of the converter 11 is higher than the related gear ratio associated with the clutch 190, the coil 213 is energized to place the transmission 12' in second gear, and when the speed ratio of the converter is lower than the related gear ratio associated with the clutch 191, the coil 212 is energized to place the transmission 12' in first gear. Shifts to other gears will be obvious from this example. The composite governor 119, as well as the governor 13, senses the direction of the deviation from the geared ratio, is characterized by precise operation and is inherently free from hunting.

The control of the clutches may be interrupted at any time by opening the master switch 234, regardless of the position of the radial switch 235. Thereafter, to start in first gear, the radial switch 235 is manually rocked to close on the contact 237, if not already in such position, and the master switch 234 is closed.

An important advantage of the composite governor 119 is its ability to control upshifts and downshifts in power shift gear transmissions having any number of gear ratios provided that such ratios do not differ unevenly by large amounts. If such differences are large and uneven, it may be necessary to employ one or more additional governors appropriately driven by the input and output shafts of the converter 11.

In either event, it will be apparent that as the load increases in any particular gear, the governor will shift the transmission 12' to a lower gear and as the load decreases in any particular gear, the governor will shift the transmission 12' to a higher gear, these shifts occurring in relation to selected converter speed ratios.

If it is desired to manually control gear shifts in a transmission by the use of the FIG. 11 governor, it will be apparent that the fluid clutch control system would not be necessary and that light bulbs would be substituted for the coils 181 and 184, the remainder of the relay 182 being eliminated.

I claim:

1. The combination of an hydraulic torque converter, shafts respectively connected to the impeller and turbine of the converter to form a power train, and mechanism responsive to a change in a predetermined speed ratio of the shafts comprising axially spaced, rotatable members adapted to be respectively driven at the same speed by the shafts when at said speed ratio, rotors carried by the opposed ends of the members and having arms provided with contacts which engage when said speed ratio changes, and electric circuit means including the contacts when engaged, and means activated when the contacts engage.

2. A combination as defined in claim 1 wherein one of the members comprises two parts, one part being driven by the impeller shaft and the other part carrying one of the rotors and related to said one part for synchronous rotation therewith when the contacts are out of engagement and for relative rotation when the contacts are in engagement.

3. A combination as defined in claim 2 wherein one of the parts carries an armature disk and the other part carries a permanent magnet operably associated with the disk.

4. The combination of an hydraulic torque converter, shafts respectively connected to the impeller and turbine of the converter, gear transmission connected to the turbine shaft including fluid shift means for determining a gear shift, and mechanism responsive to a change in a predetermined speed ratio of the shafts comprising axially spaced, rotatable members adapted to be respectively driven at the same speed by the shafts when at said speed ratio, rotors carried by the opposed ends of the members and having arms provided with contacts which engage when said speed ratio changes, and electric circuit means including the contacts when engaged, and a solenoid operated valve shiftable between positions admitting and denying fluid to the fluid shift means corresponding to engagement and release of the contacts.

5. A combination as defined in claim 4 wherein one of the members comprises two parts, one part being driven by the impeller shaft and the other part carrying one of the rotors and related to said one part for synchronous rotation therewith when the contacts are out of engagement and for relative rotation when the contacts are in engagement.

6. A combination as defined in claim 5 wherein one of the parts carries an armature disk and the other part carries a permanent magnet operably associated with the disk.

7. The combination of an hydraulic torque converter, shafts respectively connected to the impeller and turbine of the converter, a gear transmission connected to the turbine shaft including a pair of fluid shift means for respectively determining two gear shifts, and mechanism responsive to changes in two predetermined speed ratios of the shafts comprising first and second assemblies responsive to the changes, respectively, the first assembly comprising first rotatable, axially spaced and aligned pair of input members adapted to be respectively driven at the same speed by the shafts when at one of said speed ratios, each first assembly member including a radially disposed, laterally projecting contact and the first assembly contacts being positioned for intercepting engagement when said one speed ratio changes, and the second assembly comprising second rotatable, axially spaced and aligned pair of input members adapted to be respectively driven at the same speed by the shafts when at the other of said speed ratios, each second member including a radially disposed, laterally projecting contact and the second assembly contacts being positioned for intercepting engagement when said other speed ratio changes, and electric circuit means including the contacts when closed of each assembly, respectively, and a solenoid operated valve for each assembly controlled by the closing and opening of the contacts of the associated assembly and shiftable between positions admitting and denying fluid, respectively, to the fluid shift means of the associated clutch.

8. A combination as defined in claim 7 wherein one of the input members in the first and second assemblies comprises two parts, one part being driven by the impeller shaft and the other part carrying one of the contacts of the associated assembly, the parts in the respective assemblies being related for synchronous rotation when the associated contacts are out of engagement and for relative rotation when the last named contacts are in engagement.

9. A combination as defined in claim 8 wherein one of the parts carries an armature disk and the other part carries a permanent magnet operably associated with the disk.

10. A combination as defined in claim 7 wherein the contacts in the first assembly are positioned to engage when the input member thereof adjacent one end of the mechanism rotates faster than the other input member thereof and the contacts in the second assembly are positioned to engage when the input member thereof adjacent said one end of the mechanism rotates slower than the other input member thereof.

11. A combination as defined in claim 10 wherein the first and second assemblies are each associated with an electric circuit, each circuit including the contacts when closed of an assembly, a relay coil in series with the contacts, and switch means controlled by the relay coil, the solenoid operated valve being moved to a position admitting fluid to the associated fluid shift means when said last named contacts engage to energize the relay coil and move the switch means to a position completing the circuit through the solenoid of the valve, and holding circuit connection between the first and second assembly circuits for maintaining the energization of the relay coil when the associated contacts disengage.

12. The combination of an hydraulic torque converter, shafts respectively connected to the impeller and turbine of the converter, a gear transmission connected to the turbine shaft including a plurality of power shift means for respectively determining a plurality of gear shifts, and mechanism responsive to changes in predetermined speed ratios of the shafts corresponding to the gear shifts comprising first and second assemblies responsive to the changes, respectively, the first assembly comprising first rotatable, axially spaced and aligned pair of input members adapted to be respectively driven at the same speed by the shafts when at any of said speed ratios, each first assembly member including a radially disposed, laterally projecting lug and the first assembly lugs being positioned for intercepting engagement when any one of said speed ratios change, each first assembly lug having a contact on the rotationally leading and trailing faces thereof, respectively, and the second assembly comprising second rotatable, axially spaced and aligned pair of input members adapted to be respectively driven at the same speed by the shafts when at any one of said speed ratios, each second assembly member including a radially disposed, laterally projecting lug and the second assembly lugs being positioned for intercepting engagement when any of said speed ratios change, each second assembly lug having a contact on the rotationally leading and trailing faces thereof, respectively, and parallel electric circuits comprising a first circuit including the engaging first and second assembly contacts when the first and second assembly input members adjacent one end of the mechanism rotate faster than the other input members of the respective assemblies, and a first relay coil, and a second electric circuit including the engaging first and second assembly contacts when the first and second assembly input members adjacent said one end of the mechanism rotate slower than the other input members of the respective assemblies, and a second relay coil, a step-by-step relay including the relay coils, armatures respectively controlled by the energization of the coils, and switch means shiftable by operation of the relay to engage any one of a plurality of contacts equal in number to that of the gear shifts, and means electrically connecting each of the contacts with an associated power shift means.

13. A combination as defined in claim 12 wherein the power shift means is of the fluid actuated type and each relay contact electrically connects with a solenoid operated valve controlled by the energization of an associated coil and shiftable between positions admitting and denying fluid, respectively, to the fluid shift means of the associated gear shift.

14. Mechanism responsive to a change in a predetermined speed ratio of a pair of associated shafts forming part of a power train comprising axially spaced, rotatable members adapted to be respectively driven at the same speed by the shafts when at said speed ratio, rotors carried by the opposed ends of the members and having arms provided with contacts which engage when said speed ratio changes, and electric circuit means including the contacts when engaged and means providing a signal when the speed ratio changes.

References Cited in the file of this patent

UNITED STATES PATENTS

| | | |
|---|---|---|
| 2,484,011 | Brunken et al. | Oct. 11, 1949 |
| 2,913,931 | Hilpert | Nov. 24, 1959 |

FOREIGN PATENTS

| | | |
|---|---|---|
| 446,979 | Great Britain | May 8, 1936 |